United States Patent [19]

Smith

[11] Patent Number: 5,402,579
[45] Date of Patent: Apr. 4, 1995

[54] C-CLAMPS WITH INTEGRAL BUBBLE LEVELS

[76] Inventor: Robert K. Smith, 429 B Lawson Rd., Smyrna, Tenn. 37167

[21] Appl. No.: 214,438

[22] Filed: Mar. 18, 1994

[51] Int. Cl.⁶ ............................................. G01C 9/28
[52] U.S. Cl. .................................... 33/354; 33/334; 33/347; 33/371
[58] Field of Search ............... 33/354, 333, 334, 347, 33/371, 379, 529, 530

[56] References Cited

U.S. PATENT DOCUMENTS

| | | | |
|---|---|---|---|
| 1,235,279 | 7/1917 | Bernier | 33/371 |
| 2,419,941 | 5/1947 | Belzung | 33/371 |
| 3,383,772 | 5/1968 | Gardner et al. | 33/379 |
| 3,824,700 | 7/1974 | Rutty | 33/379 |
| 4,066,232 | 1/1978 | Hermeyer | 33/372 |
| 4,274,208 | 6/1981 | Yakkel | 33/371 |
| 4,394,799 | 7/1983 | Moree et al. | 33/371 |
| 4,589,213 | 5/1986 | Woodward | 33/371 |
| 4,908,949 | 3/1990 | Jaccard | 33/334 |
| 5,058,407 | 10/1991 | Parker | 33/371 |

*Primary Examiner*—Christopher W. Fulton

[57] ABSTRACT

A C-clamp with integral bubble levels comprising a C-clamp which has a horizontal portion with two generally parallel vertical portions extending perpendicularly from the ends of the horizontal portion. The first vertical portion is formed with a threaded circular aperture with the axis of which is parallel with the horizontal portion. The second of the vertical portions is provided with a planar surface perpendicular to the axis of the aperture. A rod with exterior threads extends through the aperture and is rotatably coupled thereto whereby rotation of the rod will effect its axial movement. The end of the rod between the vertical portions is provided with a planar surface parallel with the planar surface of the first vertical portion. A planar surface is formed on the horizontal portion on the side thereof remote from the vertical portions. A bubble level is removedly secured to the planar surface.

1 Claim, 2 Drawing Sheets

C-CLAMPS WITH INTEGRAL BUBBLE LEVELS

BACKGROUND OF THE INVENTION

1. Field of the Invention

The present invention relates to C-clamps with integral bubble levels and more particularly pertains to leveling pipes secured to C-clamps.

2. Description of the Prior Art

The use of C-clamps and bubble levels is known in the prior art. More specifically, C-clamps and bubble levels heretofore devised and utilized for the purpose of clamping and leveling pipes are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,066,232 to Hermeyer a clamp-on level holder.

U.S. Pat. No. 4,274,208 to Yakkal discloses a precision bending level.

U.S. Pat. No. 4,394,799 to Moree discloses a conduit bending plane indicator.

U.S. Pat. No. 4,589,213 to Woodward discloses a conduit bending level.

U.S. Pat. No. 5,058,407 to Parker discloses a level for use in bending conduit.

In this respect, the C-clamps with integral bubble levels according to the present invention substantially departs from the conventional concepts and designs of the prior art, and in doing so provides an apparatus primarily developed for the purpose of to level pipes secured to C-clamps.

Therefore, it can be appreciated that there exists a continuing need for new and improved C-clamps with integral bubble levels which can be used for leveling pipes secured to C-clamps. In this regard, the present invention substantially fulfills this need.

SUMMARY OF THE INVENTION

In view of the foregoing disadvantages inherent in the known types of C-clamps and bubble levels now present in the prior art, the present invention provides an improved C-clamps with integral bubble levels. As such, the general purpose of the present invention, which will be described subsequently in greater detail, is to provide a new and improved C-clamps with integral bubble levels and method which has all the advantages of the prior art and none of the disadvantages.

To attain this, the present invention essentially comprises a new and improved C-clamp with integral bubble levels comprising, in combination, a C-clamp having a horizontal portion with two generally parallel vertical portions extending perpendicularly from the ends of the horizontal portion, the first vertical portion being formed with a threaded circular aperture with the axis of which being parallel with the horizontal portion, the second of the vertical portions being provided with a planar surface perpendicular to the axis of the aperture; a rod with exterior threads extending through the aperture and rotatably coupled thereto whereby rotation of the rod will effect its axial movement, the end of the rod between the vertical portions being provided with a planar surface parallel with the planar surface of the first vertical portion; a planar surface formed on the horizontal portion on the side thereof remote from the vertical portions; and a bubble level, the bubble level being formed of a transparent elongated cylinder with downwardly extending legs along the length thereof and a recessed horizontal planar surface positionable on the planar surface of the horizontal portion with the legs straddling the horizontal portion in gripping relationship therewith, the bubble level also including a fluid within the cylinder sufficient to allow a bubble to be formed therein, the cylinder also being provided with parallel rings adjacent to the center thereof whereby when the planar surfaces of the vertical components are gripping a pipe with the horizontal portion and cylinder in an intended horizontal orientation, the bubble will be at the center of the cylinder between the markings.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved C-clamps with integral bubble levels which have all the advantages of the prior art C-clamps and bubble levels and none of the disadvantages.

It is another object of the present invention to provide new and improved C-clamps with integral bubble levels which may be easily and efficiently manufactured and marketed.

It is further object of the present invention to provide new and improved C-clamps with integral bubble levels which are of durable and reliable constructions.

An even further object of the present invention is to provide new and improved C-clamps with integral bubble levels which are susceptible of a low cost of manufacture with regard to both materials and labor, and which accordingly are then susceptible of low prices of sale to the consuming public, thereby making such C-clamps with integral bubble levels economically available to the buying public.

Still yet another object of the present invention is to provide new and improved C-clamps with integral bubble levels which provide in the apparatuses and methods of the prior art some of the advantages thereof, while simultaneously overcoming some of the disadvantages normally associated therewith.

Still another object of the present invention is to level pipes secured to C-clamps.

Lastly, it is an object of the present invention to provide new and improved C-clamp with integral bubble levels comprising a C-clamp having a horizontal portion with two generally parallel vertical portions extending perpendicularly from the ends of the horizontal portion, the first vertical portion being formed with a threaded circular aperture with the axis of which being parallel with the horizontal portion, the second of the vertical portions being provided with a planar surface perpendicular to the axis of the aperture; a rod with exterior threads extending through the aperture and rotatably coupled thereto whereby rotation of the rod will effect its axial movement, the end of the rod between the vertical portions being provided with a planar surface parallel with the planar surface of the first vertical portion; a planar surface formed on the horizontal portion on the side thereof remote from the vertical portions; a bubble level.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
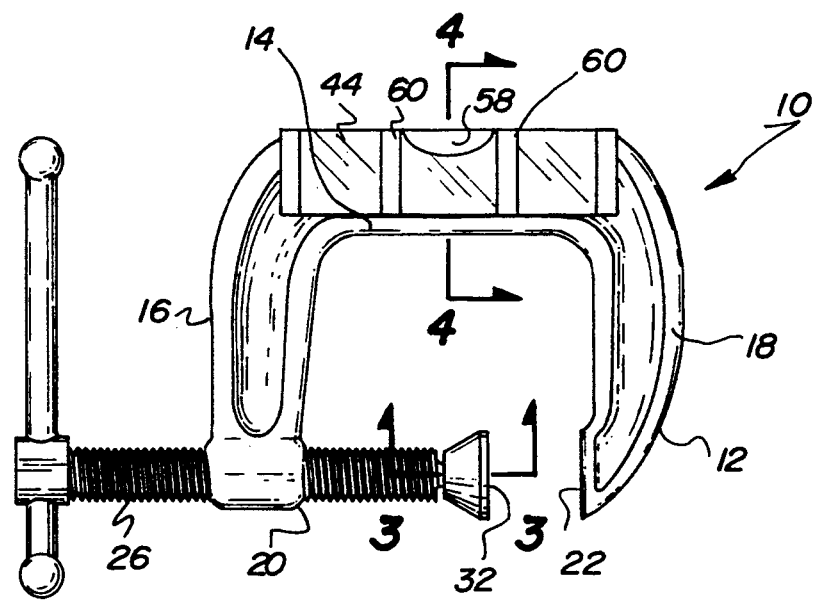
FIG. 1 is a perspective view of the preferred embodiment of the C-clamps with integral bubble levels constructed in accordance with the principles of the present invention.
Figure 2:
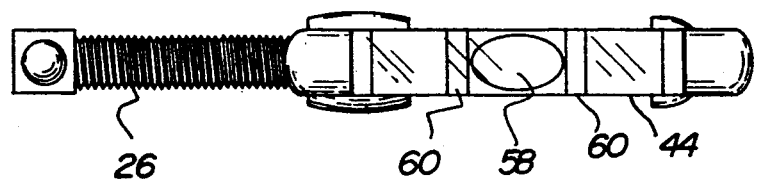
FIG. 2 is top elevational view of the device illustrated in FIG. 1.
Figure 3:
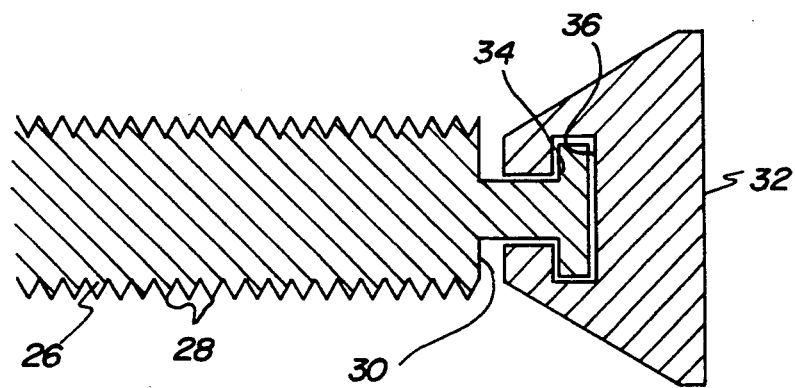
FIG. 3 is a cross sectional view taken along line 3—3 of FIG. 1.
Figure 4:
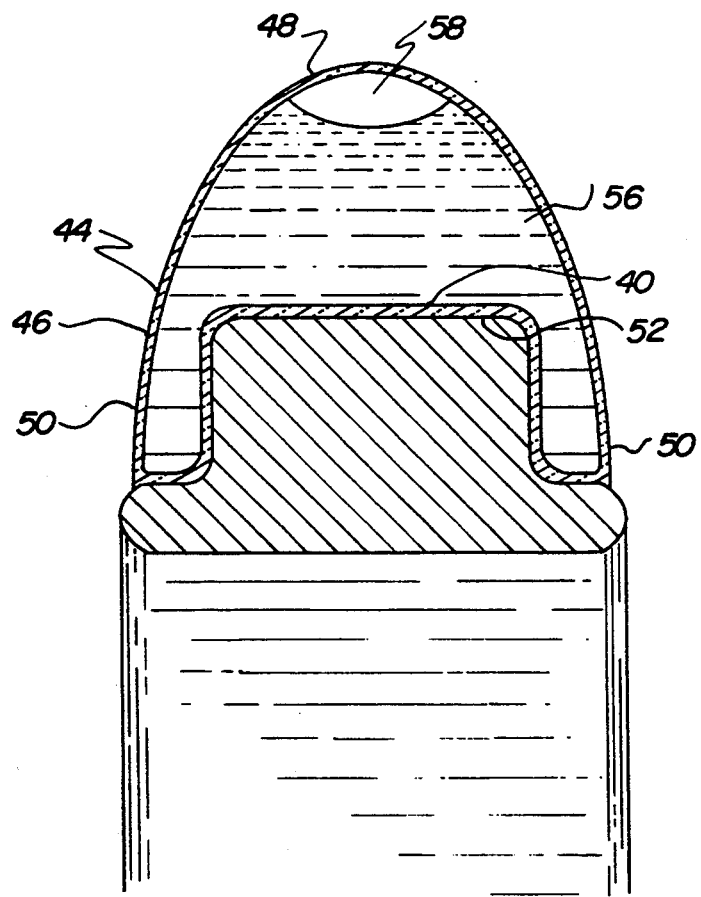
FIG. 4 is a cross sectional view taken along line 4—4 of FIG. 1.

With reference now to the drawings, and in particular to FIG. 1 thereof, the preferred embodiment of the new and improved C-clamps with integral bubble levels embodying the principles and concepts of the present invention and generally designated by the reference numeral 10 will be described.

Specifically, the present invention, the new and improved C-clamps with integral bubble levels, is comprised of a plurality of component elements. In their simplest terms, such elements include the C-clamp, the rod, a planar surface on the horizontal portion of the C-clamp, and a bubble level coupled thereto. Such component elements are specifically configured individually and correlated one with respect to the other in order to attain the proper intended objective.

More specifically, the C-clamp 12 is generally conventional in that it has a horizontal portion 14 and two generally parallel vertical portions 16 and 18 extending at right angles from the ends of the horizontal portions. The first of the vertical portions is formed with a threaded circular aperture 20 therethrough. The axis of such aperture is parallel with the horizontal portion of the C-clamp. The other or second of the vertical portions is provided with a planar surface 22. Such planar surface is perpendicular to the axis of the aperture.

The next component of the invention is a rod 26. The rod is provided with external threads 28. The rod is positioned through the aperture and with its threads in operative coupling with the threads of the first vertical portion of the C-clamp. In this manner, rotation of the rod will effect its axial movement due to the relationships of the threads therebetween. The end of the rod 30 between the vertical portions of the C-clamp is provided with a planar surface 32. Such planar surface is on a block rotatably supported by a cylindrical enlargement 34 at the end of the rod received within a complementary shaped recess 36 in the end of the block remote from its planar surface. Such planar surface is parallel with the planar surface of the first vertical plane.

An additional planar surface 40 is formed on the horizontal portion of the C-clamp. Such planar surface on the horizontal portion is on the side thereof remote from the vertical portions.

The last component of the invention is a bubble level 44. The bubble level is formed of a transparent elongated cylinder 46. Such cylinder has a curved upper surface 48 with downwardly extending legs 50. The legs are parallel with each other. Between the legs is a recessed horizontal surface 52 of the cylinder. This allows the positioning of the planar surface of the cylinder on the planar surface of the horizontal portion with the legs of the cylinder straddling the horizontal portion of the C-clamp. Such straddling effects a gripping relationship between the cylinder and the C-clamp. A more secure coupling therebetween is, in an alternate embodiment of the invention, effected through the use of a thin layer of adhesive between the two surfaces.

Located within the cylinder is a fluid 56. The fluid within the cylinder is of sufficient quantity to fill the cylinder except for a small air bubble 58. The cylinder is also provided with a plurality of parallel markings 60 equally spaced outwardly from the center of the cylinder. In this manner, when the planar surfaces of the vertical components are gripping a pipe or other object and when the horizontal portion of the C-clamp and cylinder are in the intended horizontal orientation, then the bubble will be located at the center of the cylinder between the markings and a proper leveling of the pipe coupled by the C-clamp will be effected.

Plumbers, pipe fitters, electricians, welders, and other professional artisans frequently need to make offset bends in piping, conduits, and tubing while performing their job. It is important that the bends are as nearly perfect as possible. Bending machines used to produce these bends are either mechanical/hydraulic or electric/hydraulic machines. To set the pipe or conduit in the bending machine properly, the artisan needs a tool that will clamp it in place and, at the same time, assure that the pipe is level. This is where the present invention comes to play.

The present invention is a combination C-clamp and bubble level that is used to set pipe, tubing, or conduit in a bending machine prior to bending. The C-clamp is a one inch swivel foot C-clamp. Mounted horizontally on its top is a vial bubble level that is 1½ inches long. Thus, it can be seen that, to make a perfect offset bend, the artisan clamps the present invention on to the pipe to be bent, sets the pipe in the bending machine while checking the bubble vial to assure the pipe is level, and then performs the bend.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved C-clamp with integral bubble levels comprising, in combination:

a C-clamp having a horizontal portion with two generally parallel vertical portions extending perpendicularly from the ends of the horizontal portion, the first vertical portion being formed with a threaded circular aperture with the axis of which being parallel with the horizontal portion, the second of the vertical portions being provided with a planar surface perpendicular to the axis of the aperture;

a rod with exterior threads extending through the aperture and rotatably coupled thereto whereby rotation of the rod will effect its axial movement, the end of the rod between the vertical portions being provided with a planar surface parallel with the first vertical portion and rotatably secured thereto;

a planar surface formed on the horizontal portion on the side thereof remote from the vertical portions with vertical recesses on the sides thereof; and a bubble level, the bubble level being formed of a transparent elongated cylinder with downwardly extending legs along the length thereof and a recessed horizontal planar surface positionable on the planar surface of the horizontal portion with the legs straddling the horizontal portion in gripping relationship with the vertical recesses, the bubble level and its legs being located laterally within the lateral faces of the horizontal portion, the bubble level also including a fluid within the cylinder sufficient to allow a bubble to be formed therein, the cylinder also being provided with parallel rings adjacent to the center thereof whereby when the planar surfaces of the vertical components are gripping a pipe with the horizontal portion and cylinder in an intended horizontal orientation, the bubble will be at the center of the cylinder between the markings.

* * * * *